May 21, 1946.  L. W. W. CLARKE ET AL  2,400,810
APPARATUS FOR TREATING GASES WITH LIQUIDS
Filed Jan. 18, 1944
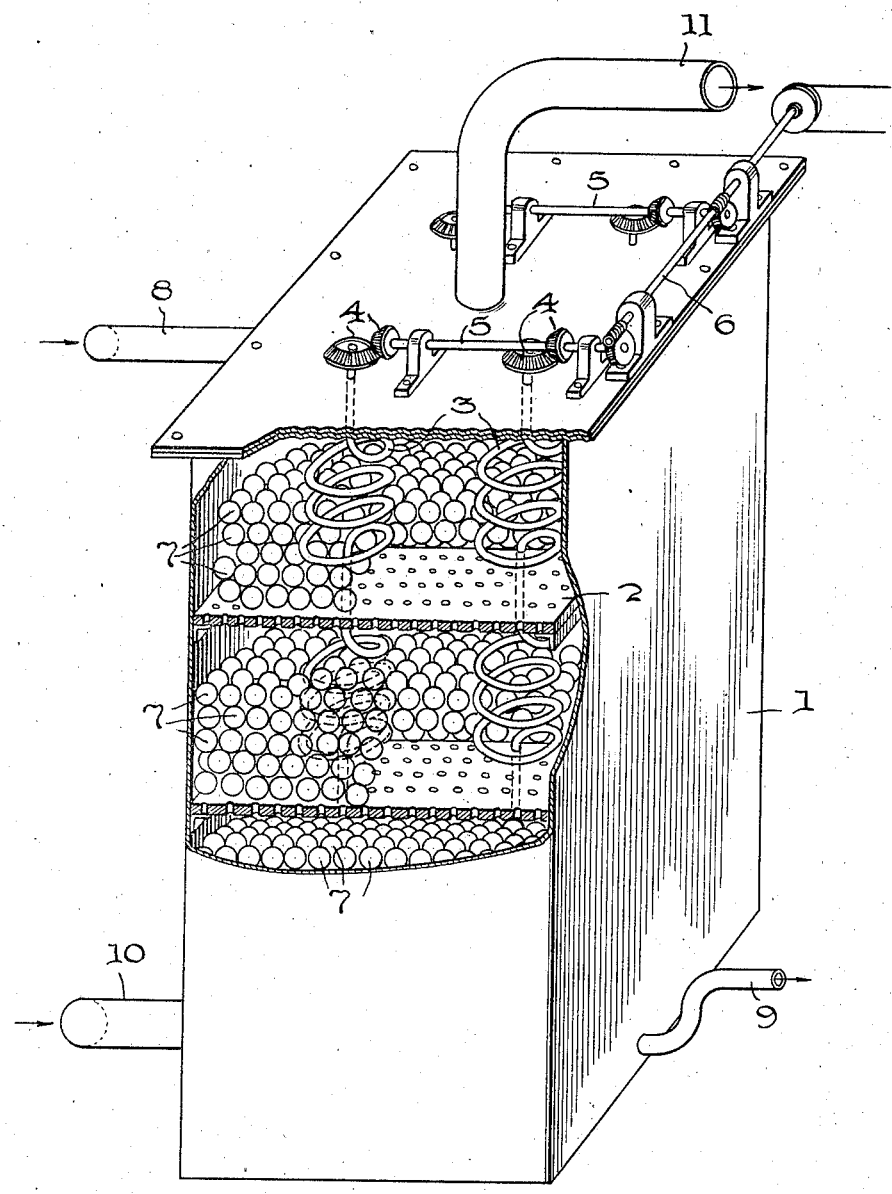
Inventors
LIONEL W. W. CLARKE
BRIAN J. BYRNE
AGENT Patented May 21, 1946

2,400,810

UNITED STATES PATENT OFFICE 2,400,810

APPARATUS FOR TREATING GASES WITH LIQUIDS

Lionel Willoughby Wynne Clarke, North Rand, Transvaal, Union of South Africa, and Brian Justice Byrne, Mold, Wales, assignors to Imperial Chemical Industries Limited, a corporation of Great Britain Application January 18, 1944, Serial No. 518,764
In Great Britain September 14, 1942

8 Claims. (Cl. 261—94)

This invention relates to improvements in apparatus for treating gases with liquids, and more particularly for treating gases with liquids containing suspended solids.

In industrial processes many instances occur where continuous methods of treating gases with liquids are required in which solid matter either accumulates in the liquid during the treatment or is introduced with it. An example of such a process is the production of calcium cyanide by absorbing hydrocyanic acid from hydrocyanic acid-containing gases by contacting them with lime slurry. In such a process attempts have been made to achieve continuous operation by passing the gases up a packed tower down which the slurry is passing, and various forms of packing have been proposed including spherical bodies such as wooden balls. Frequently, however, and especially where high liquor rates are not feasible, the difficulty is met that the packing becomes choked by the deposition of solids upon it, and unsatisfactory operation of the absorption system results due to reduced throughput and increased pressure drop.

According to the present invention an apparatus is provided for contacting gases with liquids containing suspended solids, comprising an absorption tower containing as a packing a plurality of deformable resilient bodies, and having means for agitating the bodies, means for supplying the gas to be treated to the tower, means for removing residual gases from the tower, means for supplying to the upper part of the tower a liquid containing suspended solids and means for withdrawing liquid containing suspended solids from the lower part of the tower. Advantageously the means for agitating the said bodies comprise at least one helical member disposed in the tower among the deformable resilient bodies and adapted to be rotated about its axis from outside the tower.

According to a further feature of the invention a process is provided for contacting a gas with a liquid containing suspended solids, which comprises causing the gas and the liquid to flow over a plurality of deformable resilient bodies, which bodies are subjected to agitation during the process so as to bring about temporary deformation of their surfaces.

By the use of resilient deformable bodies as the packing over which the liquid containing suspended solids is caused to flow so as to come into contact with the gas, the advantage is realised that the surfaces of the packing bodies can be deformed periodically, and adjacent bodies rub against each other in so doing, so that any solid tending to lodge upon them is either rubbed off by the friction between the bodies, or broken off through the deformation and is thus washed off by the liquor. The best results are obtained when spherical bodies are used since the packing is simpler, and in order that deformation of substantial magnitude can be attained, the bodies may be hollow. Balls of natural or synthetic rubber are very suitable.

In one form of our invention the absorption tower is provided at intervals up its height with horizontal openwork platforms through which the liquids and gases can flow, and which are adapted to support the spherical bodies. In each section of the tower thus formed a number of helical members are disposed vertically and the section is filled or partly filled with hollow rubber balls. Suitably the balls are, for example, 2 to 3 inches in diameter and the helix to which the helical members conform has a substantially greater diameter, e. g. a diameter 3 to 4 times this value. The pitch of the helix may be quite large, say approximately equal to the diameter of the helix, so that while a large number of the balls can be moved in turn as the helical member rotates, the resistance to rotation is not large, and balls can move about within the helix and pass from inside to outside it. Similarly, if non-spherical bodies are used, the pitch and diameter of the helix should be substantially greater than any diameter of the bodies. The helical members are provided with means for rotating them from outside about the axis of the helix, and are distributed over the cross section of the tower, so that the balls are agitated when they rotate. The tower is provided in the customary manner with an inlet for the gases and an outlet for the liquor at the base, while at the top is an outlet for any unabsorbed gases and an inlet for the liquor. Means for distributing the liquid evenly over the packing should be provided at the top, and if desired, redistributing means for the liquor can be provided at intervals down the tower, for example, immediately below each openwork platform. In some cases it will be possible to dispense with the openwork platforms, and to have a considerable depth of the spherical bodies with correspondingly long helical members.

In using such an apparatus for the manufacture of calcium cyanide by contacting hydrocyanic acid-containing gases with a lime slurry, the gases are fed to the base of the tower and the lime slurry to the top. The two thus pass counter-current through the tower so that cyanide-containing liquor is formed and withdrawn from the base, and the gases, substantially free from hydrocyanic acid, are withdrawn at the top. Periodically the helical members are caused to revolve so that the balls are temporarily compressed against one another and agitated. The agitation, and the deformation resulting from the compression, cause any scale or deposit of lime adhering to the balls to be broken up, rubbed off, and thus carried down with the liquor. This can be done while the tower is in use, and thus continuous operation is possible over an extended period without substantial pressure drop or loss of efficiency due to choking or partial blockage. The helical members may be rotated continuously by a suitable mechanism, or they may be rotated only at intervals, either by machine or by hand.

One form of the invention is illustrated in the accompanying diagram representing an isometric view of an absorption tower, parts of the walls of which are omitted to show the arrangement inside.

In this diagram the absorption tower 1 has within it a number of horizontal perforated grids 2 extending across the cross section of the tower at different heights so as to divide it into sections. Each section contains a large number of rubber balls 7 resting on the grids or on each other, and filling the major portion of the section. In the diagram some of these are omitted to enable the grids 2 and members 3, 3 to be shown. The four members 3, 3 (two of which are shown) each consist of a number of helical portions, one in each section of the tower, alternating with vertical axial straight portions passing through the grids. For ease of assembly each grid is made in several portions, and it is arranged that the axial portions of members 3 are located between joints in the adjacent portions of the grids; if desired recesses may be provided at the edges of the various portions of the grids to receive the axial portions and give support to the members 3. The upper end of each member 3 passes through the roof of the tower and terminates in one of two bevel gear wheels 4, the other wheel of the pair being attached to one of two shafts 5. The latter are in turn operatively connected through a worm and pinion gearing on shaft 6 to a source of power not shown. Alternatively, the shaft 6 may terminate in a crank- or other handle. By causing shaft 6 to rotate each helical portion of the four members 3 can be made to rotate and thus agitate the balls in each section of the tower.

The absorption tower is also provided with a gas inlet 10 at the bottom and a gas outlet 11 at the top. An inlet 8 for liquor containing suspended solids is provided near the top of the tower by which liquor can be fed to a distributor (not shown) and thence downwards through the tower, passing in turn over the rubber ball packing in each of the sections. Liquor which has passed through the tower can be drawn off at 9 through a lute.

In using this apparatus, e. g., for absorbing hydrocyanic acid from gases containing it by contacting them with lime slurry, the lime slurry is fed in through the inlet 8 and the gases are fed in at 10. The latter thus pass up the tower through the interstices in the grid and between the rubber balls 7, while the slurry flows down over the surfaces of the balls. The hydrocyanic acid in the gas is absorbed, and the treated gas leaves the tower by the outlet 11, while the solution of calcium cyanide produced leaves the tower at 9. As the process is continued lime may be deposited on some of the rubber ball packings and an increase in the pressure drop through the absorber would then result. By periodically causing shaft 6 to rotate, the helices will rotate and move the individual rubber balls forming the packing, and cause them to press against one another and become temporarily dented. As a result the lime which has deposited will be loosened or rubbed off, and then carried forward by the oncoming liquor. If desired the helical members may be rotated continuously, although in general, agitation for a few minutes at intervals of a few hours will suffice. The frequency will depend on such factors as the amount of solid in suspension, and the rate at which liquor is fed to the tower.

Instead of using the apparatus for absorbing hydrocyanic acid in lime slurry it may be used for other purposes in which solid is introduced into the tower with the liquid or in which solid is formed in the tower as the result of interaction between the gas and the liquid, and is carried down by the latter. Thus for example, the apparatus may be used for absorbing chlorine or hypochlorous acid in a slurry of lime or chalk, or washing hydrochloric acid gases with an aqueous solution of hydrochloric acid and a soluble calcium salt containing suspended calcium sulphate to remove traces of sulphur dioxide.

We claim:

1. An apparatus for contacting a gas with a liquid containing suspended solids comprising an absorption tower containing as a packing a plurality of deformable resilient bodies, said tower having rotating stirring means for agitating and temporarily deforming the said bodies whereby the deforming of the resilient bodies breaks loose accretions adhering thereto and permits the agitation to remove said accretions therefrom, means for supplying the liquid to the upper part of the tower, means for withdrawing liquid from the lower part of the tower, means for supplying the gas to be treated to the tower, and means for withdrawing residual gas from the tower.

2. An apparatus for contacting a gas with a liquid containing suspended solids comprising an absorption tower containing as a packing a plurality of hollow rubber balls, said tower having rotating stirring means for agitating and temporarily deforming the said balls whereby the deforming of the rubber balls breaks loose accretions adhering thereto and permits the agitation to remove said accretions therefrom, means for supplying the liquid to the upper part of the tower, means for withdrawing liquid from the lower part of the tower, means for supplying gas to be treated to the tower, and means for withdrawing residual gas from the tower.

3. An apparatus for contacting a gas with a liquid containing suspended solids comprising an absorption tower containing as a packing a plurality of deformable resilient bodies, said tower having means for supplying the liquid to the upper part of the tower, means for withdrawing liquid from the lower part of the tower, means for supplying gas to be treated to the tower, means for withdrawing residual gas from the tower, and means for agitating the said bodies comprising at least one helical member disposed in the tower among the said bodies and having means for rotating each such helical member about its axis from outside the tower.

4. An apparatus according to claim 3 in which both the pitch and the diameter of each of the said helical members is substantially greater than any diameter of the said deformable bodies.

5. An apparatus for contacting a gas with a liquid containing suspended solids comprising an absorption tower containing as a packing a plurality of hollow rubber balls, said tower having means for supplying the liquid to the upper part of the tower, means for withdrawing liquid from the lower part of the tower, means for supplying gas to be treated to the tower, means for withdrawing residual gas from the tower, and means for agitating the said balls comprising at least one helical member disposed in the tower among the said balls and means for rotating each of such helical members about its axis from outside the tower.

6. An apparatus according to claim 5 in which both the pitch and the diameter of each of such helical members is substantially greater than the diameter of the said balls.

7. An apparatus for contacting a gas with a liquid containing suspended solids comprising an absorption tower containing as a packing a plurality of hollow rubber balls of like diameter, said tower having means for supplying the liquid to the upper part of the tower, means for withdrawing liquid from the lower part of the tower, means for supplying gas to be treated to the tower, means for withdrawing residual gas from the tower, and means for agitating the said balls comprising at least one helical member disposed in the tower among the said balls and means for rotating each of such helical members about its axis from outside the tower.

8. An apparatus according to claim 7 in which both the pitch and the diameter of each of such helical members is substantially greater than the diameter of the said balls.

LIONEL WILLOUGHBY WYNNE CLARKE.
BRIAN J. BYRNE.